(12) United States Patent
Baumert et al.

(10) Patent No.: US 12,534,002 B2
(45) Date of Patent: Jan. 27, 2026

(54) VEHICLE SEAT WITH A VIBRATION-ABSORBER

(71) Applicant: Bayerische Motoren Werke Aktiengesellschaft, Munich (DE)

(72) Inventors: Jan Baumert, Allershausen (DE); Michael Leng, Geltendorf (DE); Mathias Schmidt, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 170 days.

(21) Appl. No.: 18/286,288

(22) PCT Filed: Jun. 21, 2022

(86) PCT No.: PCT/EP2022/066873
§ 371 (c)(1),
(2) Date: Oct. 10, 2023

(87) PCT Pub. No.: WO2023/285083
PCT Pub. Date: Jan. 19, 2023

(65) Prior Publication Data
US 2024/0190310 A1    Jun. 13, 2024

(30) Foreign Application Priority Data
Jul. 16, 2021    (DE) ..................... 10 2021 118 485.1

(51) Int. Cl.
*B60N 2/50* (2006.01)
*B60N 2/54* (2006.01)

(52) U.S. Cl.
CPC ............... *B60N 2/503* (2013.01); *B60N 2/54* (2013.01)

(58) Field of Classification Search
CPC . B60N 2/503; B60N 2/50; B60N 2/54; B60N 2/64
(Continued)

(56) References Cited

U.S. PATENT DOCUMENTS 4,353,594 A * 10/1982 Lowe ..................... B60N 2/525
297/307
4,641,732 A   2/1987 Andry
(Continued)

FOREIGN PATENT DOCUMENTS

CN    104385952 A    3/2015
DE    103 27 770 A1   1/2005
(Continued)

OTHER PUBLICATIONS

International Search Report (PCT/ISA/210) issued in PCT Application No. PCT/EP2022/066873 dated September 12, 2022 with English translation (4 pages).
(Continued)

*Primary Examiner* — Justin V Lewis
(74) *Attorney, Agent, or Firm* — Crowell & Moring LLP

(57) ABSTRACT

A vehicle seat has a vibration absorber. The vehicle seat includes a seat base part and a backrest, which is disposed on the seat base part and is provided with a head restraint. The vibration absorber is disposed in the backrest or in the head restraint and is mounted there on a backrest structure or on a head restraint structure. The vibration absorber has a damper mass, which is supported relative to the backrest structure or to the head restraint structure by way of elastic elements. The spring stiffness of the elastic elements can be adjusted via an actuation mechanism.

15 Claims, 3 Drawing Sheets

(58) Field of Classification Search
USPC .............. 297/216.1, 216.12, 216.13, 216.14,
297/216.15, 216.16, 216.17, 216.19,
297/217.1, 452.49, 452.5, 452.51
See application file for complete search history.

(56) References Cited

U.S. PATENT DOCUMENTS

| | | |
|---|---|---|
| 6,216,833 B1 | 4/2001 | Lefferts et al. |
| 2016/0052431 A1* | 2/2016 | Barnard .................. B60N 2/02 297/217.1 |
| 2019/0039490 A1 | 2/2019 | Kajino |
| 2022/0089076 A1* | 3/2022 | Mishiba ................... A47C 7/38 |

FOREIGN PATENT DOCUMENTS

| | | |
|---|---|---|
| DE | 20 2008 004 078 U1 | 8/2008 |
| DE | 10 2018 210 547 A1 | 2/2019 |
| EP | 2 602 152 A1 | 6/2013 |
| JP | 60-151135 A | 8/1985 |
| JP | 2004-116654 A | 4/2004 |
| WO | WO 01/56830 A1 | 8/2001 |
| WO | WO-2020149231 A1 * | 7/2020 .............. F16F 7/108 |

OTHER PUBLICATIONS

German-language Written Opinion (PCT/ISA/237) issued in PCT Application No. PCT/EP2022/066873 dated Sep. 12, 2022 with English translation (8 pages).
German-language Search Report issued in German Application No. 10 2021 118 485.1 dated Dec. 10, 2021 with partial English translation (11 pages).

* cited by examiner

VEHICLE SEAT WITH A VIBRATION-ABSORBER

BACKGROUND AND SUMMARY

The invention relates to a vehicle seat with a vibration-absorber. It further relates to a vehicle, in particular a motor vehicle, with at least one such vehicle seat.

Especially in the case of vehicle seats with increased mass in the seat back, caused, for instance, by integration of a safety belt into the seat back, or by integration of other fittings serving for comfort (work table, monitor, etc.), the frequency of natural vibration of the seat is reduced, which in vehicle operation results in shaking of the seat, in particular of the seat back, or even in disturbing noises. The frequency of natural vibration of the vehicle seat often affects the excitation frequency of the vehicle, resulting in vibrations of the vehicle seat that can be perceived particularly intensely. In particular, a large mass in the upper region of the backrest has a negative effect on a weight-optimized seat substructure as regards the occurrence of perceptible vibrations of the vehicle seat. In addition, the position of the seat changes the frequency of natural vibration of the seat. These problems are countered with vibration-absorbers that have been provided in the vehicle seat, in particular in the seat back. Vibration-absorbers of such a type are usually designed for one frequency range, but this represents a compromise.

It is known from EP 2 602 152 A1 to furnish a headrest, which exhibits a headrest cushion capable of swiveling about a transverse axis, with elastic elements counteracting the swiveling motion. These elastic elements have been arranged so as to be adjustable in their radial position with respect to the transverse axis, this adjustment being performed as a function of the height position of the headrest. In this connection, the objective is to damp vibrations of the headrest about the transverse axis.

The object of the present invention is to provide an improved generic vehicle seat in which the occurrence of natural vibrations during vehicle operation is further reduced.

This object is achieved with the features of the independent claims.

Such a vehicle seat with a vibration-absorber exhibits a seat-base part and a seat back arranged on the seat-base part and furnished with a headrest. The vibration-absorber is arranged in the seat back or in the headrest and has been attached there to a backrest structure or to a headrest structure, respectively. In accordance with the invention, the vibration-absorber is distinguished in that it exhibits an absorber mass which is supported relative to the backrest structure or relative to the headrest structure, respectively, by use of elastic elements, and in that the spring hardness of the elastic elements is adjustable by an actuating mechanism.

The adjustability of the spring hardness of the vibration-absorber creates the possibility of setting the frequency of natural vibration, and therefore enables the vibration-absorber to be designed for differing frequency ranges.

Further preferred and advantageous design features of the vehicle seat according to the invention are the subject-matter of the dependent claims.

The actuating mechanism has preferentially been designed to set the spring hardness of the elastic elements as a function of the setting of the vehicle seat, in particular as a function of the inclination angle of the seat back. As a result, the damping element, and with it the damping effect, can be adapted to the respective position of the vehicle seat.

In a particularly preferred configuration of the invention, the vibration-absorber exhibits a yoke with a first pressure element and with a second pressure element, the pressure elements being relocatable—in particular, traversable or displaceable—relative to one another along a first direction, and being guided by way of a guide arrangement, and the elastic elements and the absorber mass having been clamped between the pressure elements of the vibration-absorber. By virtue of a change in the clamping, the elastic elements are more or less compressed, by virtue of which their spring hardness changes, resulting in a change in the frequency of natural vibration of the spring/mass oscillator constituted by the absorber mass and the elastic elements of the vibration-absorber.

In this connection, it is an advantage if the actuating mechanism is designed to move the pressure elements toward one another and away from one another along the first direction, or parallel thereto.

It is also advantageous if the elastic elements are constituted by elastomeric damping bodies, or exhibit such bodies.

In a particularly preferred embodiment of the invention, which is capable of being combined with other embodiments, the actuating mechanism exhibits at least one actuator. Such an actuator may exhibit or constitute a mechanical drive, a manually or automatically actuatable Bowden cable, or an electrical, pneumatic or hydraulic drive.

In this connection, it is an advantage if the at least one actuator is capable of being controlled by a control device and for this purpose is capable of having actuation commands applied to it by the control device. Electrically adjustable seats can control the actuator via the control unit for the electrical seat adjustment, which then constitutes the control device.

The control device is preferentially coupled with at least one sensor for data transmission, which has been designed to capture at least one parameter of the setting of the vehicle seat.

Finally, it is also an advantage if the control device is connected to a characteristic-map storage device, or exhibits such a device, in which setting values for the spring hardness of the elastic elements have been stored as a function of setting parameters of the vehicle seat. Depending on the seat position, this characteristic-map controller can be set mechanically, for instance via a control cam on the mechanism and/or via a Bowden cable, or electrically/pneumatically/hydraulically via an actuator.

In another advantageous embodiment of the vehicle seat according to the invention, the mass of the vehicle seat, including that of a passenger sitting on the vehicle seat, can be ascertained via weight sensors and can be utilized as further control variable for the setting of the vibration-absorber.

The invention is also directed toward a vehicle, in particular toward a motor vehicle, with at least one vehicle seat according to the invention.

Preferred exemplary embodiments of the invention with additional design details and with further advantages are described and elucidated in more detail below with reference to the appended drawings.

DETAILED DESCRIPTION OF THE DRAWINGS

Figure 1:
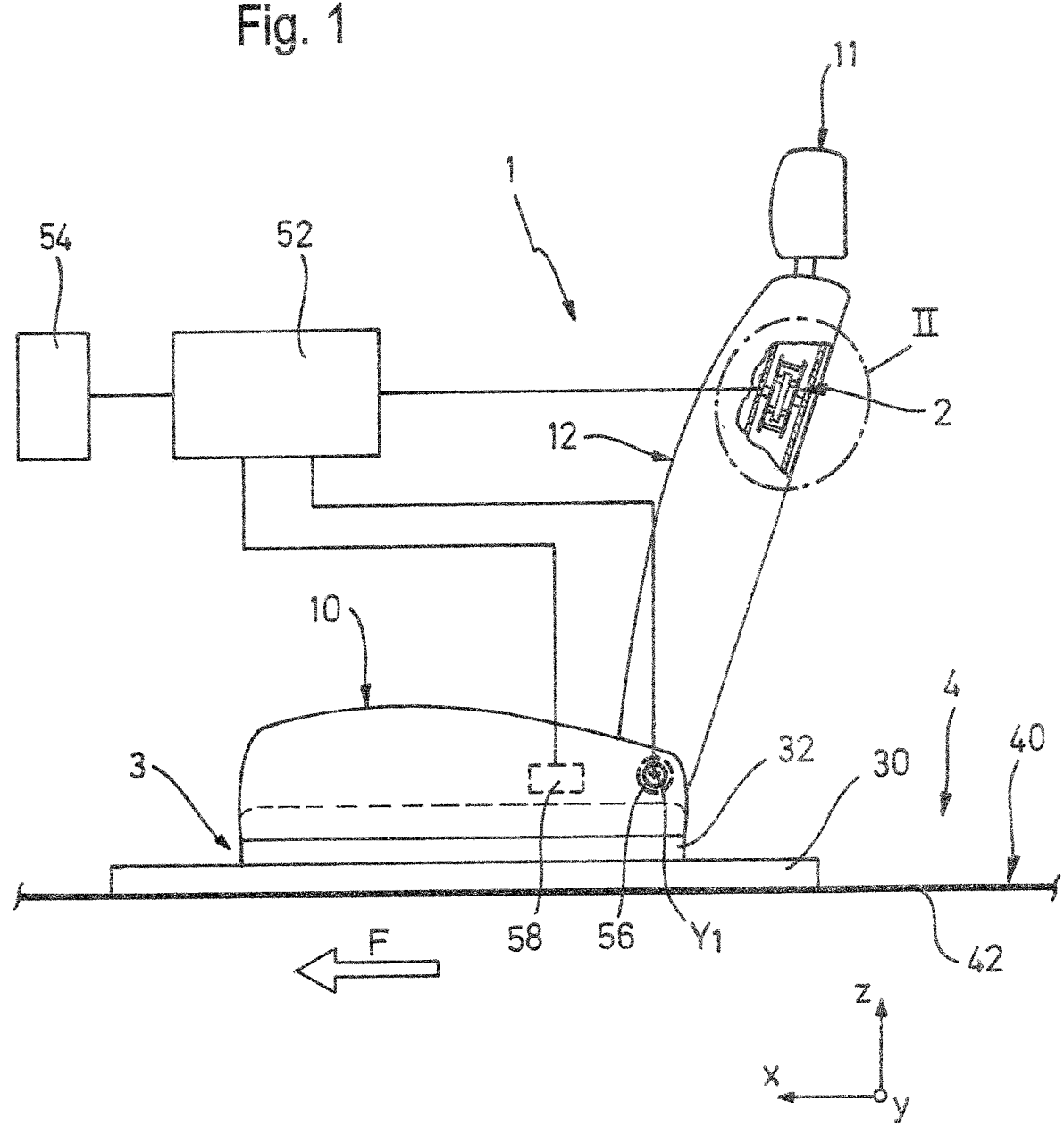
FIG. 1 is a partially sectioned side view of a vehicle seat according to an embodiment of the invention with a vibration-absorber.

FIG. 1 shows a vehicle seat 1 in a schematic, partially sectioned, side view with a seat-base part 10 and with a seat back 12 which, on its upper side, has been furnished with a headrest 11 and in which a vibration-absorber 2 has been provided. By means of an apparatus 3 for longitudinal seat adjustment, the seat-base part 10 has been connected in a manner known to a person skilled in the art—for instance, by screw coupling—to a floor panel 42 pertaining to the vehicle structure 40 of a vehicle 4. The apparatus 3 for longitudinal seat adjustment exhibits a left lower rail and a right lower rail 30, connected to the floor panel 42. To each lower rail 30 an upper rail 32 has been assigned which is supported in a displaceable and lockable manner with respect to the respective lower rail 30.

The vibration-absorber 2 is arranged in the upper part of the seat back 12 and will be described in more detail below with reference to FIG. 2.

In its interior, which is bounded by a seat cover 13 with a fixed backrest rear wall 14, the seat back 12 has been furnished with a backrest structure 15 which, in the example shown, exhibits an inner structural support 16, extending in the longitudinal direction of the backrest, and a posterior structural support 17 extending in the longitudinal direction of the backrest, between which the vibration-absorber 2 is arranged.

The vibration-absorber 2 is constituted by a yoke 20 which exhibits an anterior, first pressure element 21 and a posterior, second pressure element 22, these pressure elements being capable of being moved toward one another and away from one another relative to one another along a first direction R at right angles to the pressure elements 21, 22. Guide bolts 23, 24 of a guide arrangement 25 penetrate guide apertures 21', 21" and 22', 22" of the pressure elements 21, 22, as a result of which the pressure elements 21, 22 are guided along the guide bolts 23, 24 parallel to the first direction R. Between the pressure elements 21, 22 an absorber mass 26 is arranged which is supported elastically between the pressure elements 21, 22 by means of anterior elastic elements 27, 27' and posterior elastic elements 28, 28'. The elastic elements 27, 27', 28, 28' are each constituted by a damping body made of an elastomeric material, for instance by a rubber pad.

Figure 2:
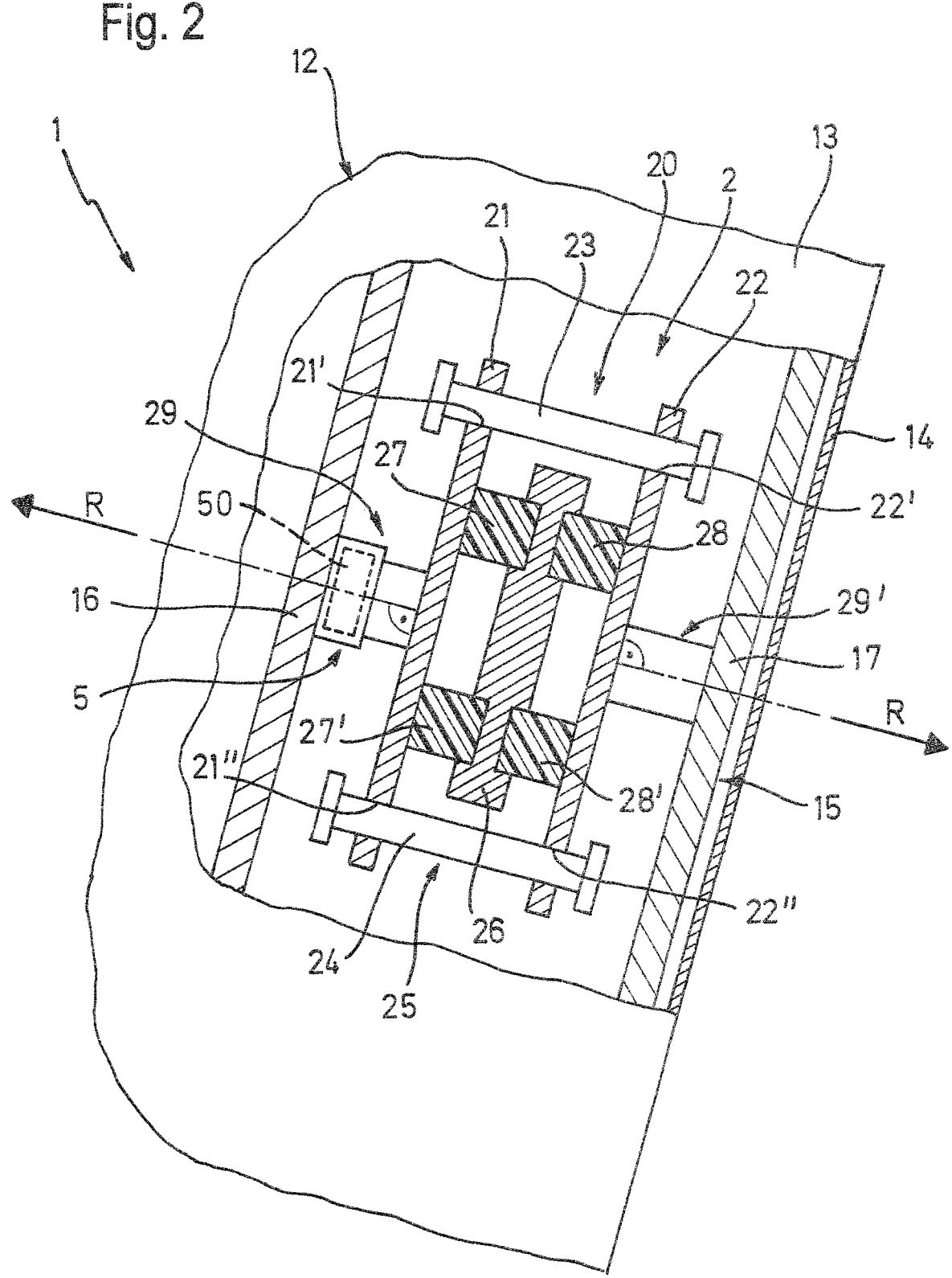
FIG. 2 is an enlarged view of the vibration-absorber from FIG. 1, according to detail II in FIG. 1.

The vibration-absorber 2 is retained on the inner structural support 16 and on the posterior structural support 17 by means of fixtures 29, 29' which are represented only schematically in FIG. 2. At least one of the two fixtures 29, 29' constitutes an actuating mechanism 5, or exhibits such a mechanism, that has been designed to bring about a relative relocation of the two pressure elements 21, 22 toward one another or away from one another. Only the anterior fixture 29 is represented schematically in FIG. 2 as an element of the actuating mechanism 5. Alternatively, the posterior fixture 29' may constitute an element of the actuating mechanism 5, or both fixtures 29 and 29' may constitute elements of the actuating mechanism 5.

Figure 3A:
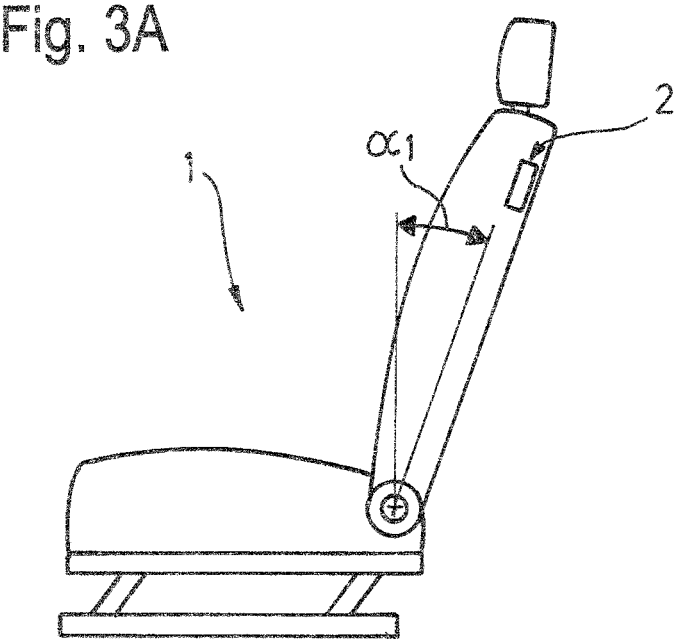
FIG. 3A is a side view of the vehicle seat from FIG. 1 with the seat back upright.
Figure 3B:
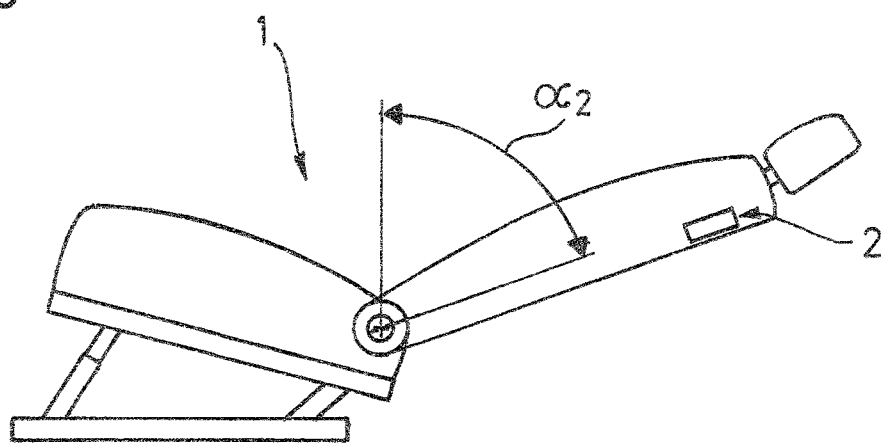
FIG. 3B is a side view of the vehicle seat from FIG. 1 with the seat back tilted into a reclining position.

The actuating mechanism 5 exhibits at least one electrically (or, alternatively, pneumatically or hydraulically) actuatable actuator 50 which, in the example shown, has been integrated into the anterior fixture 29, designed in the manner of a telescope, and can extend or retract this fixture telescopically. The at least one actuator 50 is activated by a control device 52, only represented schematically in FIG. 1 (typically an electronic controller), which is connected to an inclination-angle sensor 56 for determining the inclination angle $\alpha_1$, $\alpha_2$ of the backrest (FIGS. 3A and 3B) about the inclination axis $y_1$ of the backrest relative to the vertical, and also to at least one weight sensor 58, provided in the vehicle seat 1, for determining the mass of the passenger resting on the vehicle seat 1, and to a characteristic-map storage device 54 for data transmission.

An actuation of the at least one actuator 50 of the actuating mechanism 5 brings about a more or less intense clamping of the absorber mass 26 between the two pressure elements 21, 22, as a result of which the spring hardness of the elastic elements 27, 27', 28, 28' becomes greater (=stiffer) in the case of more intense clamping, or smaller (=softer) in the case of less-intense clamping. As a result, the frequency of natural vibration of the vibration-absorber 2 also changes, so that this natural frequency is capable of being changed by means of the actuating mechanism 5, and the vibration absorption of the vehicle seat, in particular of the seat back thereof, is capable of being adapted to the current dynamic needs.

The invention is not restricted to the above exemplary embodiment, which serves merely for general elucidation of the central idea of the invention. Rather, within the scope of protection the apparatus according to the invention may also assume configurations other than those described above. In this connection, the apparatus may, in particular, exhibit features that represent a combination of the respective individual features of the claims.

Reference symbols in the claims, in the description and in the drawings serve merely for better comprehension of the invention and are not intended to restrict the scope of protection.

LIST OF REFERENCE SYMBOLS 1 vehicle seat
2 vibration-absorber
3 apparatus for longitudinal seat adjustment
4 vehicle
5 actuating mechanism
10 seat-base part
11 headrest
12 seat back
13 seat cover
14 rear wall of backrest
15 backrest structure
16 structural support
17 structural support
20 yoke
21 anterior pressure element
21' guide aperture
21" guide aperture
22 posterior pressure element
22' guide aperture
22" guide aperture
23 guide bolt
24 guide bolt
25 guide arrangement
26 absorber mass
27 anterior elastic element
27' anterior elastic element
28 posterior elastic element 28' posterior elastic element
29 anterior fixture
29' posterior fixture
30 lower rail
32 upper rail
40 vehicle structure
42 floor panel
50 actuator
52 control device
54 characteristic-map storage device
56 inclination-angle sensor
58 weight sensor
F direction of travel
R direction of motion
$y_1$ backrest inclination axis
$\alpha_1$ backrest inclination angle
$\alpha_2$ backrest inclination angle

What is claimed is:

1. A vehicle seat, comprising:
a seat-base part;
a seat back arranged on the seat-base part and provided with a headrest; and
a vibration absorber arranged in the seat back or in the headrest, the vibration absorber being attached to a backrest structure or to a headrest structure,
wherein the vibration-absorber has an absorber mass which is supported via elastic elements, the elastic elements having a spring hardness adjustable via an actuating mechanism,
wherein the vibration-absorber comprises a yoke with a first pressure element and with a second pressure element, said first and second pressure elements being relocatable relative to one another along a first direction, and being guided by a guide arrangement, and
wherein the elastic elements and the absorber mass are clamped between the first and second pressure elements of the vibration-absorber.

2. The vehicle seat according to claim 1, wherein
the actuating mechanism is configured to adjust a compression of the elastic elements based on a setting of the vehicle seat, the setting of the vehicle seat comprising at least one of: an assignment of a seat component to a particular configuration, a seat position, and/or a seat mass.

3. The vehicle seat according to claim 2, wherein
the setting of the vehicle seat is an inclination angle of the seat back.

4. The vehicle seat according to claim 1, wherein
the actuating mechanism is configured to move the first and second pressure elements toward one another and away from one another along the first direction.

5. The vehicle seat according to claim 1, wherein
the elastic elements are or have elastomeric damping bodies.

6. A vehicle comprising at least one vehicle seat according to claim 1.

7. A vehicle seat, comprising:
a seat-base part;
a seat back arranged on the seat-base part and provided with a headrest; and
a vibration absorber arranged in the seat back or in the headrest, the vibration absorber being attached to a backrest structure or to a headrest structure,
wherein the vibration-absorber has an absorber mass which is supported via elastic elements, the elastic elements having a spring hardness adjustable via an actuating mechanism, and
the actuating mechanism comprises at least one actuator, wherein a control device is configured to control the at least one actuator and adjustments to the spring hardness of the elastic elements.

8. The vehicle seat according to claim 7, wherein
the control device is coupled with at least one sensor for data transmission, which sensor is configured to capture at least one parameter of a setting of the vehicle seat.

9. The vehicle seat according to claim 8, comprising:
a characteristic-map storage device in communication with the control device, wherein the characteristic-map storage device stores values for setting the spring hardness of the elastic elements based on the setting of the vehicle seat.

10. The vehicle seat according to claim 7, wherein
the actuating mechanism is configured to adjust a compression of the elastic elements based on a setting of the vehicle seat, the setting of the vehicle seat comprising at least one of: an assignment of a seat component to a particular configuration, a seat position, and/or a seat mass.

11. The vehicle seat according to claim 10, wherein
the setting of the vehicle seat is an inclination angle of the seat back.

12. A vehicle comprising at least one vehicle seat according to claim 7.

13. A vehicle seat, comprising:
a seat-base part;
a seat back arranged on the seat-base part and provided with a headrest; and
a vibration absorber arranged in the seat back or in the headrest, the vibration absorber being attached to a backrest structure or to a headrest structure,
wherein the vibration-absorber has an absorber mass which is supported via elastic elements, the elastic elements having a spring hardness adjustable via an actuating mechanism, and
wherein the elastic elements are or have elastomeric damping bodies, and
wherein the actuating mechanism is configured to adjust a compression of the elastic elements based on a setting of the vehicle seat, the setting of the vehicle seat comprising at least one of: an assignment of a seat component to a particular configuration, a seat position, and/or a seat mass.

14. The vehicle seat according to claim 13, wherein
the setting of the vehicle seat is an inclination angle of the seat back.

15. A vehicle comprising at least one vehicle seat according to claim 13.

* * * * *